(12) United States Patent
Saga et al.

(10) Patent No.: US 7,133,230 B2
(45) Date of Patent: Nov. 7, 2006

(54) RECORDING HEAD AND INFORMATION RECORDING APPARATUS

(75) Inventors: Hideki Saga, Fuchu (JP); Takuya Matsumoto, Hachioji (JP); Kei Ishikawa, Kokubunji (JP); Hirofumi Sukeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 235 days.

(21) Appl. No.: 10/697,094

(22) Filed: Oct. 31, 2003

(65) Prior Publication Data

US 2004/0081031 A1    Apr. 29, 2004

(30) Foreign Application Priority Data

Nov. 5, 2002    (JP)    ............................. 2002-320625

(51) Int. Cl.
*G11B 5/02*    (2006.01)
*G11B 11/00*    (2006.01)

(52) U.S. Cl. ...................................... 360/59; 360/13.33
(58) Field of Classification Search ............. 369/13.33, 369/13.13, 13.17
See application file for complete search history.

(56) References Cited

U.S. PATENT DOCUMENTS

| | | | | |
|---|---|---|---|---|
| 6,498,776 B1 * | 12/2002 | Nakano et al. | ......... | 369/112.23 |
| 6,584,062 B1 * | 6/2003 | Naya | ...................... | 369/112.27 |
| 6,636,460 B1 * | 10/2003 | Akiyama et al. | ......... | 369/13.14 |
| 6,687,195 B1 * | 2/2004 | Miyanishi et al. | ........ | 369/13.13 |
| 6,741,524 B1 * | 5/2004 | Ichihara et al. | .......... | 369/13.01 |
| 6,795,380 B1 * | 9/2004 | Akiyama et al. | ......... | 369/13.33 |
| 6,952,380 B1 * | 10/2005 | Isshiki et al. | ............. | 369/13.33 |
| 6,963,530 B1 * | 11/2005 | Thornton et al. | ........... | 369/121 |
| 6,982,844 B1 * | 1/2006 | Rettner et al. | ................ | 360/59 |
| 7,042,810 B1 * | 5/2006 | Akiyama et al. | ......... | 369/13.33 |
| 2004/0085862 A1 * | 5/2004 | Matsumoto et al. | ...... | 369/13.33 |
| 2005/0078565 A1 * | 4/2005 | Peng et al. | .............. | 369/13.32 |

FOREIGN PATENT DOCUMENTS

| | | | |
|---|---|---|---|
| JP | 10-162444 | | 6/1998 |
| JP | 2001-255254 | * | 9/2001 |
| JP | 2002-48697 | | 2/2002 |

OTHER PUBLICATIONS

NIshida et al., "XY-stage Driving Electron-Beam Mastering with Nanometer-Accuracy Positioning for High-Density Optical Disk", Jul. 2002, International optical Memory and Optical Dtat Storage Topical Meeting, pp. 28-30.*
Ito et al., "Advanced Recording Method Using a Near-Field Optics and the GMR Head", May 2000, Conference Digest Optical Dtat Storage, pp. 30-32.*
Sukeda et al., "Thermally assisted Magnetic Recording on Flux-Detectable RE-TM Media", Jul. 2001, IEEE Transaction on Magnetics, vol. 37, Issue 4, pp. 1234-1238.*

* cited by examiner

*Primary Examiner*—Wayne Young
*Assistant Examiner*—Dismery Mercedes
(74) *Attorney, Agent, or Firm*—Mattingly, Stanger, Malur & Brundidge, P.C.

(57) ABSTRACT

To generate a satisfactory recording magnetic domain on a recording medium and to improve the durability of a recording head, an information recording apparatus for generating an optical near field and thermo-magnetically recording information on the recording medium is provided with a light source, a magnetic pole for applying a magnetic field to the recording medium and a diffuser that generates an optical near field in the vicinity of the recording medium when light from the light source is radiated. The diffuser is formed with it in contact with the magnetic pole so that the face which light from the light source irradiates is substantially perpendicular to the recording medium. Thereby, recording density in the information recording apparatus can be increased, simultaneously the reliability can be also enhanced and as a result, the cost can be reduced.

10 Claims, 7 Drawing Sheets

RECORDING HEAD AND INFORMATION RECORDING APPARATUS

BACKGROUND OF THE INVENTION

1. Field of the Invention

The present invention relates to a recording head provided with a function for optically or thermally exciting a magnetic recording medium, locally reducing the coercivity of the recording medium and thermo-magnetically recording information and an information recording apparatus using it.

2. Description of the Related Art

In Japanese published unexamined patent application No. Hei10-162444, "Magneto-optical recording medium, recording/reading method and recording/reading apparatus" (first prior art), technique utilizing a head using a solid immersion lens in a recording/reading apparatus for recording a hyperfine magnetic domain signal at a hyperfine light beam spot on a magneto-optical disk is disclosed.

Besides, in Japanese published unexamined patent application No. 2001-255254, "Optical near field probe, optical near field optical microscope using it and optical recording/ reading apparatus" (second prior art), technique related to an optical near field probe formed by a metal diffuser in a shape of a cone or a triangle formed on a substrate and a metallic, dielectric or semiconductor film formed around the diffuser and having the same thickness as the height of the diffuser and optical recording using it is disclosed.

Further, in Japanese published unexamined patent application No. 2002-48697, "Optical near field probe and its manufacturing method" (third prior art), a method of manufacturing a flat optical near field probe in which a metal diffuser is buried in a dielectric and the mean surface roughness of which is approximately 10 nm or less is disclosed.

In a recording head provided with a function for optically or thermally exciting a recording medium to change a local physical state of the recording medium and recording information and an information recording apparatus using it, a method of using a light spot stopped down up to a diffraction limit using a lens is general. In this case, the size of the light spot is approximately $\lambda$/NA when the wavelength of a light source is $\lambda$ and the numerical aperture of the lens is NA and the magnitude determines the size of an area (a so-called recording mark) in which a physical state is changed on the recording medium, that is, recording density. To increase recording density, directly the wavelength of the light source is reduced or the numerical aperture is widened, however, the development of a light source having a shorter wavelength has an extremely great problem in the material of a light source element and the efficiency of emission and the numerical aperture cannot be theoretically made larger than 1. Therefore, in information recording depending upon the light spot at the diffraction limit, there is great difficulty to increase recording density.

To conquer the difficulty, thermomagnetic information recording technique using an optical near field disclosed in the first prior art is developed. That is, the diameter of the light spot used in recording is reduced from $\lambda$/NA further to 1/n or $1/n^2$ (ˆ: power) by using the solid immersion lens made of material the refractive index of which is n so as to increase recording density. However, a high refractive index and low absorptance in a wavelength of a combined light source are required for material forming the solid immersion lens. In case a violet semiconductor laser having the shortest wavelength currently realized as a light source for recording for example is used, $\lambda$ is approximately 405 nm, however, the refractive index of optical glass that hardly absorbs in this waveband is approximately 2 and even if the optical glass is combined with a lens NA of which is 0.9, the diameter of the light spot is reduced only to approximately 110 nm. Therefore, it is difficult to stably form a recording mark in size by far smaller than the diameter of the light spot and the solid immersion lens has a limit in increasing recording density.

To conquer the limit in the first prior art, technique for generating an optical near field using a metal diffuser disclosed in the second and third prior arts is developed. As the distribution size of an optical near field equivalent to the diameter of a light spot is determined by the manufacuring precision of the metal diffuser in the prior arts, the distribution size of an optical near field can be greatly reduced by using high-resolution lithography depending upon an electron beam lithography, compared with the diameter of a light spot by the solid immersion lens. However, in these prior arts, the metal diffuser that generates an optical near field is exposed at the bottom of the recording slider and has structure that the metal diffuser is in contact with only a dielectric the thermal conductivity of which is relatively low. Therefore, a problem that when a part of recording energy is absorbed by the metal diffuser, the temperature rapidly rises, the metal diffuser is gradually oxidized, a function as the diffuser is damaged and in the worst case, the diffuser is dissolved and broken exists. Therefore, it is required that incident light from the light source can be converted to an optical near field at higher efficiency. Besides generally, as a dielectric and metal forming the diffuser are greatly different in a coefficient of thermal expansion, great stress is caused on an interface between both, and as possibility that the metal diffuser may peel and fall from the dielectric is high, the realization of a reliable recording head and a reliable information recording apparatus is hindered.

Besides, in case the similar thermomagnetic recording to a current magneto-optical disk is applied to a perpendicular magnetic recording medium advantageous in high-density magnetic recording using the second and third prior arts, the transition width of magnetization in the magnetic recording layer is determined by only a temperature gradient on the recording medium in recording. Therefore, unless the distribution size of an optical near field is reduced, the transition width of magnetization cannot be reduced and there is a limit to increase recording density without increasing the manufacuring precision of the metal diffuser.

SUMMARY OF THE INVENTION

To solve the problems, a recording head that generates an optical near field and thermo-magnetically records information on a recording medium is provided with a light source, a magnetic pole for applying a magnetic field to the recording medium and a diffuser that generates an optical near field in the vicinity of the recording medium when light from the light source irradiates the diffuser, and is characterized in that the diffuser is formed with it in contact with the magnetic pole so that the face which light from the light source irradiates is substantially perpendicular to the recording medium.

As the size of a light spot used for thermomagnetic recording can be reduced without the diffraction limit of an optical system and the limit of the material of an optical component by adopting the above-mentioned configuration, recording density on the recording medium can be increased, and the recording head is extremely advantageous in the size and the cost of an information recording apparatus. Besides, recording can be realized by the consumption of less energy. Further, heat produced by the loss of the diffuser in the recording head can be promptly diffused via the magnetic pole. As a result, the risk of the deterioration and the damage of the diffuser by the rise of temperature is reduced, stress on the vicinity of the diffuser by the heat of the diffuser is minimized and the remarkable enhancement of the reliability of the recording head and the information recording apparatus can be expected.

Besides, the back of the face which light irradiates of the diffuser is in contact with the main magnetic pole and the diffuser is arranged between the light source and the main magnetic pole. Or the diffuser is in contact with the main magnetic pole and the diffuser is arranged between the light source and the auxiliary magnetic pole. Further, the back of the face which light irradiates of the diffuser is in contact with the main magnetic pole and the diffuser is arranged between the main magnetic pole and the auxiliary magnetic pole.

As an area in which a temperature gradient by an optical near field is great can be made coincident with an area in the vicinity of the end of the main magnetic pole in which the gradient of a recording magnetic field by recording magnetic field generating means is the greatest by adopting the above-mentioned configuration, the transition width of magnetization in a magnetic recording layer can be reduced and recording density can be increased without increasing the manufacturing precision of the diffuser.

PREFERRED EMBODIMENTS OF THE INVENTION

Referring to the drawings, concrete embodiments of the invention will be described in detail below.

Figure 1:
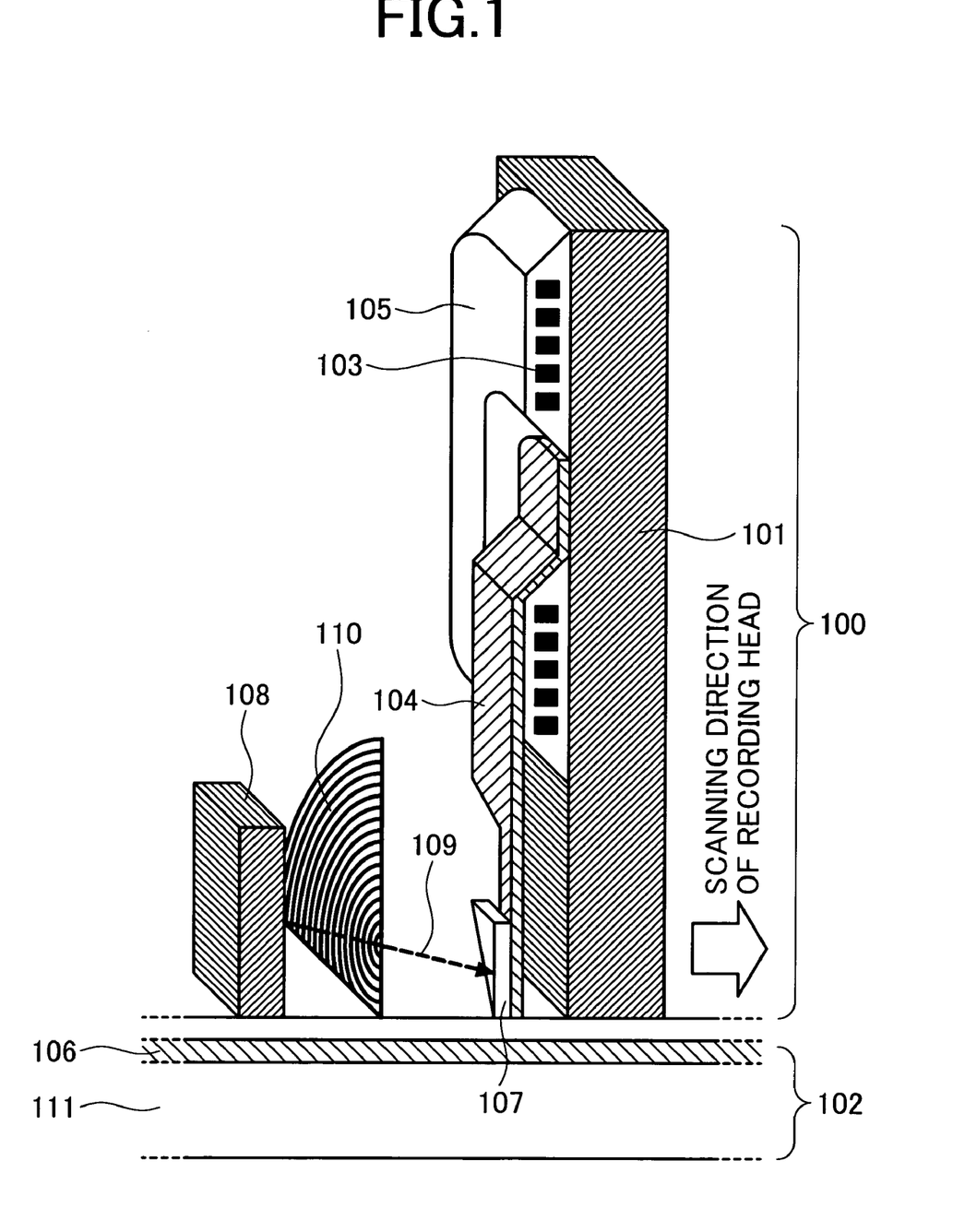
FIG. 1 shows a first example of the configuration of a recording head according to the invention.

FIG. 1 shows a first example showing the configuration of a recording head according to the invention and shows the sectional structure of the circumference of a recording mechanism in case the recording head and a recording medium are cut along their faces perpendicular to a surface of the recording medium (in a vertical direction in FIG. 1) and parallel to a scanning direction (a direction of a track which is a lateral direction in FIG. 1). The method of depiction is common in embodiments shown in FIGS. 1 to 4. In the recording head 100, a flat auxiliary magnetic pole 101 is formed so that it is substantially perpendicular to the recording medium 102 and is substantially orthogonal to the scanning direction. Further, a conductive pattern 103 made of copper is spirally formed over the auxiliary magnetic pole 101. An insulator such as aluminum oxide is filled between the conductive patterns 103 and between the auxiliary magnetic pole 101 and a main magnetic plate 104 described later to avoid a short circuit, and a coil 105 is formed in a shape of a torus as a whole. Both terminals of the conductive pattern 103 are pulled out of the recording head 100 and are connected to a magnetic head driver. In a window inside the coil 105, one end of the main magnetic pole 104 is connected to the auxiliary magnetic pole 101 through the window. The other end of the main magnetic pole 104 reaches the bottom of the recording head 100 and is opposite to the recording medium 102. The auxiliary magnetic pole 102, the main magnetic pole 104 and the coil 105 form an electromagnet as a whole and the structure of these magnetic circuits is similar to that of a single magnetic pole head for perpendicular magnetic recording. When information is recorded, a recording magnetic field is applied to a magnetic recording layer 106 in the vicinity of the end (a face opposite to the recording medium 102) of the main magnetic pole 104 by driving current supplied from the magnetic head driver. The auxiliary magnetic pole 101 and the main magnetic pole 104 are made of a permalloy. A diffuser 107 made of Au is formed at the end of the main magnetic pole 104 with the diffuser in contact with the main magnetic pole 104 at the back of a face for receiving light from a light source. The melting point of Au is 1063 C and high, even if Au is heated, it is not combined with oxygen, generates no oxide, is chemically stable and is one of suitable materials for a metal diffuser for generating an optical near field by plasmon to realize thermomagnetic recording. The end of the main magnetic pole 104 and the light receiving face of the diffuser 107 are also substantially perpendicular to the surface of the recording medium 102. When information is recorded on the recording medium 102, a laser beam 109 is radiated from a vertically cavity surface-emitting laser 108 which is the light source at the same time as the generation of a recording magnetic field. The laser beam 109 is converged by a hologram lens 110 and irradiates the diffuser 107. When the coherent laser beam 109 irradiates the metal diffuser 107, inside free electrons are identically oscillated by the electric field of the laser beam 109, as a result, plasmon is excited and an intense near field (not shown) is generated at the end (in a part opposite to the recording medium 102) of the diffuser 107. The magnetic recording layer 106 is a perpendicular magnetic recording film (for example, a TbFeCo amorphous alloy film and a Pd/Co multi-layer) having the axis of easy magnetization in a direction perpendicular to the surface of a film made on a crystallized glass substrate 111. As the magnetic recording layer 106 is heated by an optical near field in recording in the above-mentioned process and simultaneously, a recording magnetic field is applied to the magnetic recording layer by the main magnetic pole 104, a desired recording magnetic domain (recording mark) corresponding to information to be recorded can be formed on the magnetic recording layer 106 by thermomagnetic recording by suitably driving the vertically cavity surface-emitting laser 108 and the coil 105. The above-mentioned structure can be manufactured by a general lithography process. For a method of thermomagnetic recording, variations such as a light modulation recording type, a magnetic field modulation recording type and a strobe magnetic field modulation recording type exist, however, these are well-known methods and in this specification, the description of the details of these is omitted. Further in this specification, only recording in a perpendicular magnetic recording film is described as an embodiment, however, effect by the invention is not only applied to perpendicular magnetic recording but is similarly effective in in-plane magnetic recording using a recording film provided with in-plane magnetic anisotropy. In this case, the end of a main magnetic pole is required to have so-called ring head structure in which a recording magnetic field in an in-plane direction can be sufficiently applied to a recording medium.

To read information recorded in the magnetic recording layer 106, a mechanism that can detect a direction of local magnetization on the magnetic recording layer 106 as a read signal has only to be mounted on the same slider as the recording head 100. That is, information may be also read by mounting magnetic flux detecting means such as a magnetoresistive (MR) effect element, a giant magnetoresistive (GMR) effect element and a tunneling magnetoresistive (TMR) effect head and detecting a leakage flux from a magnetic recording layer, and information may be also optically (photoelectromagnetically) read by mounting means for detecting the Kerr effect and the Faraday effect of a recording medium using an optical system having a minute opening. This respect is common in embodiments shown in FIGS. 1 to 4.

In the configuration shown in FIG. 1, the following secondary effect can be acquired. For first effect, as a direction (a direction of deposition or etching) of the primary processing of the recording head 100 is limited to one direction, its manufacturing process is simplified, the manufacturing yield is enhanced and as a result, the manufacturing cost can be reduced. For second effect, an area in which a temperature gradient by an optical near field is great can be made to coincide with an area in the vicinity of the end of the main magnetic pole 104 in which the gradient of a recording magnetic field is the greatest, and transition noise in a read signal can be reduced by increasing the effective gradient of a recording magnetic field in the area. For third effect, Optimum material can be used for the main magnetic pole 104 and the diffuser 107, the efficient generation of a recording magnetic field and the efficient generation of an optical near field are both enabled and thermomagnetic recording can be realized by only the consumption of less energy. Generally for conditions demanded for the main magnetic pole 104, high saturation magnetic flux density, high magnetic permeability and little residual magnetization can be given and for material that meets these, a permalloy which is one type of a Fe—Ni alloy is typical. Further, for the main magnetic pole 104, in addition to these conditions, there are suitable shape and dimension according to the characteristic of the magnetic recording layer 106 and the positional relation with the main magnetic pole 104. In the meantime, conditions demanded for the diffuser 107 are high optical near field generation efficiency in the oscillation wavelength of a light source and high chemical stability unchanged even if the diffuser is heated to some extent in the air and for material that meets these, Au, Pd, Pt, Rh and Ir are conceivable. Further, for the diffuser 107, in addition to the oscillation wavelength of the light source and the material of the diffuser 107, there are suitable shape and dimension according to the characteristic of the magnetic recording layer 106 and the positional relation with the diffuser 107. Each desirable material, dimension and shape are generally different between the main magnetic pole 104 and the diffuser 107 as described above and it is realistically difficult to use the main magnetic pole 104 for the diffuser 107.

Figure 2:
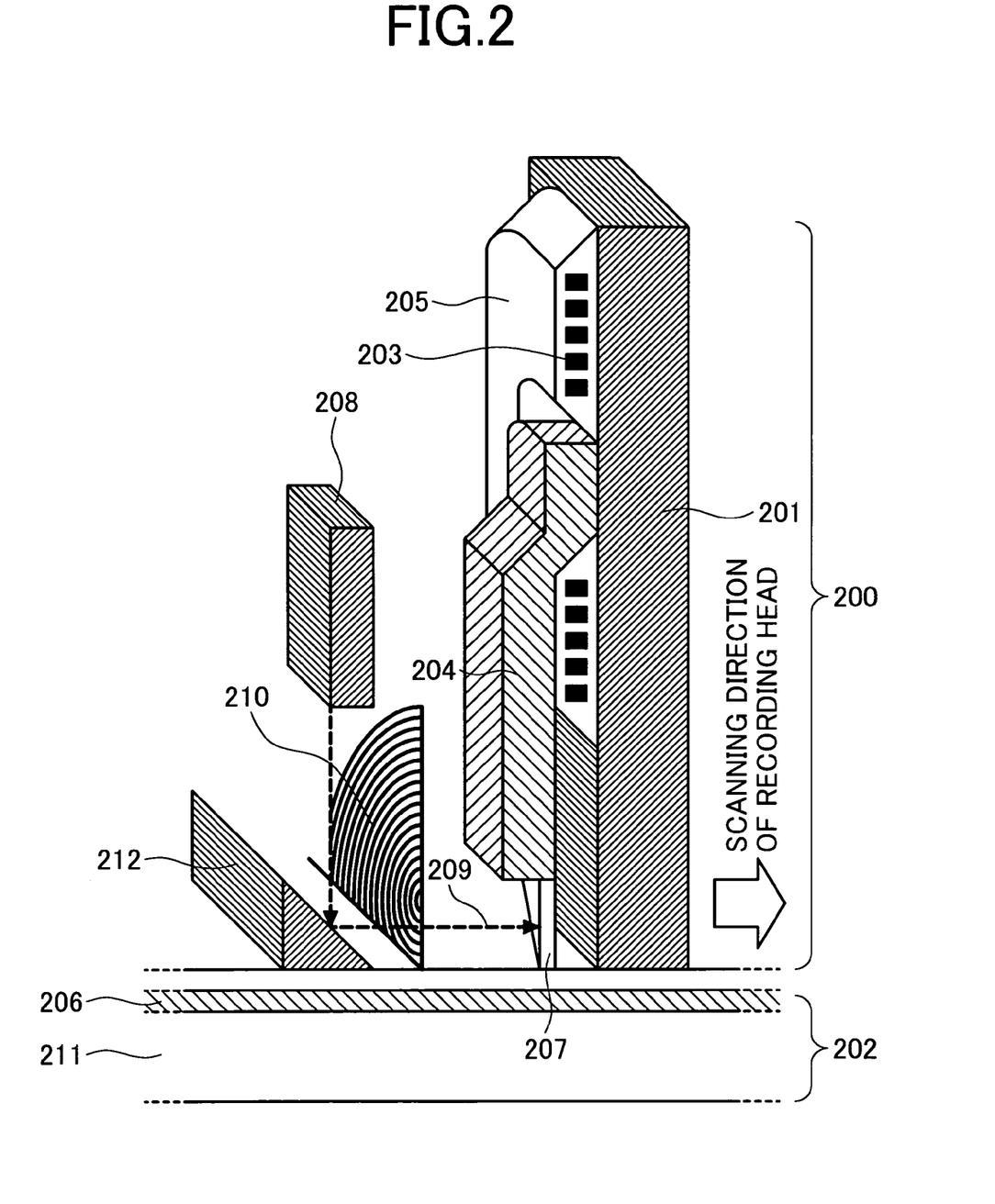
FIG. 2 shows a second example of the configuration of the recording head according to the invention.

FIG. 2 shows a second example of the configuration of the recording head according to the invention. In a recording head 200, a flat auxiliary magnetic pole 201 is formed so that it is substantially perpendicular to a recording medium 202 and is substantially orthogonal to a scanning direction. Further, on the auxiliary magnetic pole 201, a conductive pattern 203 made of copper is spirally formed. An insulator such as aluminum oxide is filled between the conductive patters 203 and between the auxiliary magnetic pole 201 and a main magnetic pole 204 described later to avoid a short circuit, and a coil 205 is formed in a shape of a torus as a whole. Both terminals of the conductive pattern 203 are pulled out of the recording head 200 and are connected to a magnetic head driver. One end of the main magnetic pole 204 is connected to the auxiliary magnetic pole 201 through a window inside the coil 205. The other end of the main magnetic pole 204 is extended in a direction of the bottom of the recording head 200. The auxiliary magnetic pole 201, the main magnetic pole 204 and the coil 205 form an electromagnet as a whole, and when information is recorded, a recording magnetic field is applied to a magnetic recording layer 206 in the vicinity of the end (a face opposite to the recording medium 202) of the main magnetic pole 204 by driving current supplied from the magnetic head driver. The auxiliary magnetic pole 201 and the main magnetic pole 204 are made of a permalloy as in the configuration shown in FIG. 1. At the end (In a part close to the recording medium 202) of the main magnetic pole 204, a diffuser 207 made of Pt is formed with a part of the diffuser in contact with the main magnetic pole 204. The melting point of Pt is 1774 C and is high, even if Pt is heated in the air, it is chemically stable without being combined with oxygen and generating oxide as long as the temperature does not exceed 450 C and is one of suitable materials for a metal diffuser for generating an optical near field by plasmon to realize thermomagnetic recording. The end of the main magnetic pole 204 and the light receiving face of the diffuser 207 are also made substantially perpendicular to the surface of the recording medium. When information is recorded on the recording medium 202, a laser beam 209 is radiated downward toward the surface of the recording medium 202 from a semiconductor laser 208 which is a light source at the same time as the above-mentioned generation of a recording magnetic field. The traveling direction of the laser beam 209 is changed at a right angle by a mirror 212, after the laser beam travels in parallel with the surface of the recording medium 202, it is converged by a hologram lens 210 and irradiates the diffuser 207. When the metal diffuser 207 is irradiated by the coherent laser beam 209, an inside free electron is uniformly oscillated by the electric field of the laser beam 209, as a result, plasmon is excited and an intense optical near field (not shown) is generated at the end of the diffuser 207 (in the part opposite to the recording medium 202). The magnetic recording layer 206 is a perpendicular magnetic recording film formed on a crystallized glass substrate 211 and having an axis of easy magnetization in a direction perpendicular to the film. As the magnetic recording layer 206 is heated by an optical near field in recording in the above-mentioned process and simultaneously, a recording magnetic field is applied by the main magnetic pole 204, a desired recording magnetic domain corresponding to information to be recorded can be formed on the magnetic recording layer 206 by thermomagnetic recording by suitably driving the semiconductor laser 208 and the coil 205.

In the configuration shown in FIG. 2, secondary effect that each optimum material can be used for the main magnetic pole 204 and the diffuser 207, the efficient generation of a recording magnetic field and the efficient generation of an optical near field are both enabled and thermomagnetic recording can be realized by only the consumption of less energy is acquired.

Figure 3:
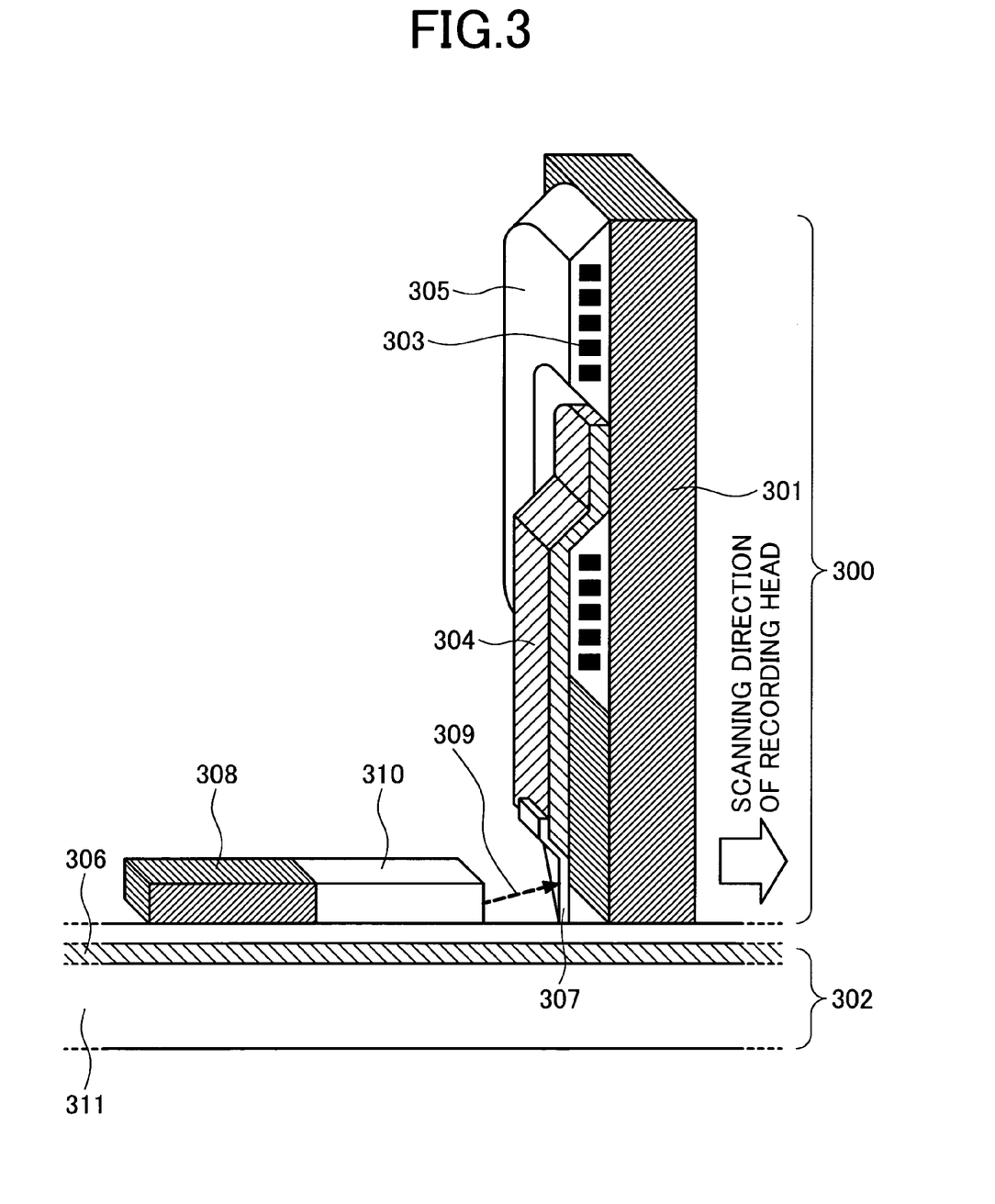
FIG. 3 shows a third example of the configuration of the recording head according to the invention.

FIG. 3 shows a third example of the configuration of the recording head according to the invention. In a recording head 300, a flat auxiliary magnetic pole 301 is formed so that it is substantially perpendicular to a recording medium 302 and is substantially orthogonal to a scanning direction. Further, on the auxiliary magnetic pole 301, a conductive pattern 303 made of copper is spirally formed. An insulator such as aluminum oxide is filled between the conductive patterns 303 and between the auxiliary magnetic pole 301 and a main magnetic pole 304 described later to avoid a short circuit and a coil 305 is formed in a shape of a torus as a whole. Both terminals of the conductive pattern 303 are pulled out of the recording head 300 and are connected to a magnetic head driver. In a window inside the coil 305, one end of the main magnetic pole 304 is connected to the auxiliary magnetic pole 301 through the window. The other end of the main magnetic pole 304 is extended in a direction of the bottom of the recording head 300. The auxiliary magnetic pole 301, the main magnetic pole 304 and the coil 305 form an electromagnet as a whole and when information is recorded, a recording magnetic field is applied to a magnetic recording layer 306 in the vicinity of the end (a face opposite to the recording medium 302) of the main magnetic pole 304 by driving current supplied from the magnetic head driver. The auxiliary magnetic pole 301 and the main magnetic pole 304 are made of a permalloy as in the configurations shown in FIGS. 1 and 2. A diffuser 307 made of Pd is formed at the end (in a part close to the recording medium 302) of the main magnetic pole 304 with the diffuser in contact with the main magnetic pole 304. The melting point of Pd is 1555 C and is high, even if Pd is heated in the air, it is chemically stable without being combined with oxygen and generating oxide as long as it is not heated to red heat and is one of suitable materials for a metal diffuser for generating an optical near field by plasmon to realize thermomagnetic recording. The end of the main magnetic pole 304 and the light receiving face of the diffuser 307 are also made substantially perpendicular to the surface of the recording medium 302. When information is recorded on the recording medium 302, a laser beam is radiated from a semiconductor laser 308 which is a light source at the same time as the generation of a recording magnetic field. The laser beam 309 is directly guided by an optical waveguide 310 from the outgoing end on the side close to the diffuser 307 and irradiates the diffuser 307. When the metal diffuser 307 is irradiated by the coherent laser beam 309, an inside free electron is uniformly oscillated by the electric field of the laser beam 309, as a result, plasmon is excited and an intense optical near field is generated at the end (in the part opposite to the recording medium 302) of the diffuser 307. The magnetic recording layer 306 is a perpendicular magnetic recording film formed on a crystallized glass substrate 310 and having an axis of easy magnetization in a direction perpendicular to the film. As the magnetic recording layer 306 is heated by an optical near field in recording in the above-mentioned process and simultaneously, a recording magnetic field is applied by the main magnetic pole 304, a desired recording magnetic domain corresponding to information to be recorded can be formed on the magnetic recording layer 306 by thermomagnetic recording by suitably driving the semiconductor laser 308 and the coil 305.

In the configuration shown in FIG. 3, secondary effect that each optimum material can be used for the main magnetic pole 304 and the diffuser 307, the efficient generation of a recording magnetic field and the efficient generation of an optical near field are both enabled and thermomagnetic recording can be realized by only the consumption of less energy is acquired.

Figure 4:
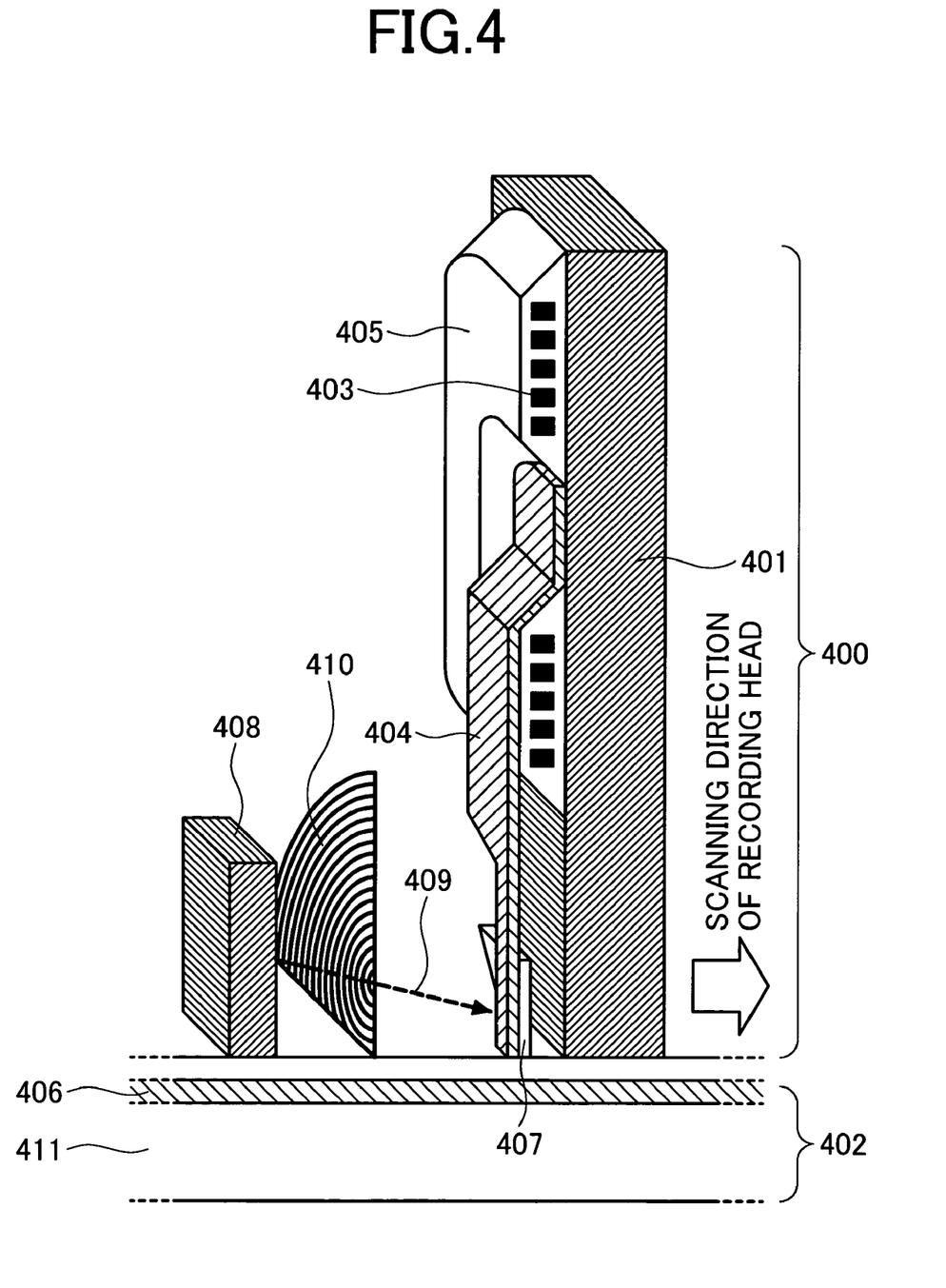
FIG. 4 shows a fourth example of the configuration of the recording head according to the invention.

FIG. 4 shows a fourth example of the configuration of the recording head according to the invention. In a recording head 400, a flat auxiliary magnetic pole 401 is formed so that it is substantially perpendicular to a recording medium 402 and is substantially orthogonal to a scanning direction. Further, on the auxiliary magnetic pole 401, a conductive pattern 403 made of copper is spirally formed. An insulator such as aluminum oxide is filled between the conductive patterns 403 and between the auxiliary magnetic pole 401 and a main magnetic pole 404 described later to avoid a short circuit and a coil 405 is formed in a shape of a torus as a whole. Both terminals of the conductive pattern 403 are pulled out of the recording head 400 and are connected to a magnetic head driver. In a window inside the coil 405, one end of the main magnetic pole 404 is connected to the auxiliary magnetic pole 401 through the window. The other end of the main magnetic pole 404 reaches the bottom of the recording head 400 and is opposite to the recording medium 402. The auxiliary magnetic pole 401, the main magnetic pole 404 and the coil 405 form an electromagnet as a whole and the structure of these magnetic circuits is the same as that of a single magnetic pole head for perpendicular magnetic recording. When information is recorded, a recording magnetic field is applied to a magnetic recording layer 406 in the vicinity of the end (a face opposite to the recording medium 402) of the main magnetic pole 404 by driving current supplied from the magnetic head driver. The auxiliary magnetic pole 401 and the main magnetic pole 404 are made of a permalloy as in the configurations shown in FIGS. 1, 2 and 3. A diffuser 407 made of Au as in the configuration shown in FIG. 1, touched to the main magnetic pole 404 with the same surface as the surface for receiving light from a vertically cavity surface-emitting laser 408 which is a light source and located between the main magnetic pole 404 and the auxiliary magnetic pole 401 is formed at the end of the main magnetic pole 404. As described above, Au is physically and chemically stable and is one of suitable materials for a metal diffuser for generating an optical near field by plasmon. The end of the main magnetic pole 404 and the light receiving face of the diffuser 407 are also made substantially perpendicular to the surface of the recording medium 402. When information is recorded on the recording medium 402, a laser beam 409 is radiated from the vertically cavity surface-emitting laser 408 which is the light source at the same time as the generation of the recording magnetic field. The laser beam 409 is converged by a hologram lens 410 and irradiates the end of the main magnetic pole 404 and the diffuser 407. In case the width (the length in a direction perpendicular to a track) of the diffuser 407 is larger than the width (the length in a direction perpendicular to the track) of the end of the main magnetic pole 404, most of laser beams 409 directly reach the diffuser 407. In case the main magnetic pole 404 is thin enough, a laser beam 409 from the vertically cavity surface-emitting laser 408 which is the light source is transmitted in the main magnetic pole 404 and similarly reaches the metal diffuser 407. As a result, plasmon is excited inside the diffuser 407 and an intense optical near field is generated at the end (in the part opposite to the recording medium 402) of the diffuser 407. A magnetic recording layer 406 is a perpendicular magnetic recording film formed on a crystallized glass substrate 410 and having an axis of easy magnetization in a direction perpendicular to the film. As the magnetic recording layer 406 is heated by an optical near field in recording in the above-mentioned process and simultaneously, a recording magnetic field is applied to the main magnetic pole 404, a desired recording magnetic domain corresponding to information to be recorded can be formed on the magnetic recording layer 406 by thermomagnetic recording by suitably driving the vertically cavity surface-emitting laser 408 and the coil 405. In FIG. 4, the diffuser 407 is touched to only the main magnetic pole 404 and is not touched to the auxiliary magnetic pole 401, however, this configuration is not inevitable configuration in the invention and the diffuser 407 may be also touched to both the main magnetic pole 404 and the auxiliary magnetic pole 401.

In the configuration shown in FIG. 4, the following secondary effect can be acquired. For first effect, as a direction (a direction of deposition or etching) of the processing of the recording head 400 is limited to one direction, the manufacturing process is simplified, the manufacturing yield is enhanced and as a result, the manufacturing cost can be reduced. For second effect, an area in which a temperature gradient by an optical near field is great can be made coincident with an area in which the gradient of a recording magnetic field in the vicinity of the end of the main magnetic pole 404 is the greatest and transition noise in a read signal can be reduced by increasing the effective gradient of a recording magnetic field in the area. Further for third effect, each optimum material can be used for the main magnetic pole 404 and the diffuser 407, the efficient generation of a recording magnetic field and the efficient generation of an optical near field are both enabled and thermomagnetic recording can be realized by only the consumption of less energy. The example of the configuration shown in FIG. 4 is different from the example of the configuration shown in FIG. 1 only in a point of view that the metal diffuser 407 is located before or after the main magnetic pole 404 when the metal diffuser is viewed from the vertically cavity surface-emitting laser 408 which is the light source. If each shape of both metal diffusers and both main magnetic poles is the same, the intensity of an optical near field generated by the metal diffuser 407 is reduced by the quantity of loss shielded or absorbed by the main magnetic pole 404 in the example of the configuration shown in FIG. 4. In a process of thermomagnetic recording, a direction of local magnetization is determined at temperature at which the coercivity of the recording medium is equal to the magnitude of a recording bias magnetic field. Therefore, for positional relation between the metal diffuser 107 or 407 and the main magnetic pole 104 or 404, it is desirable that a direction of movement with the recording medium is set so that the recording medium heated by an optical near field passes under the main magnetic pole on the way of a process of cooling. That is, the example of the configuration shown in FIG. 1 is suitable in case the recording medium 102 is relatively moved right in FIG. 1 and the example of the configuration shown in FIG. 4 is suitable in case the recording medium 402 is relatively moved left in FIG. 4.

Figure 5A:
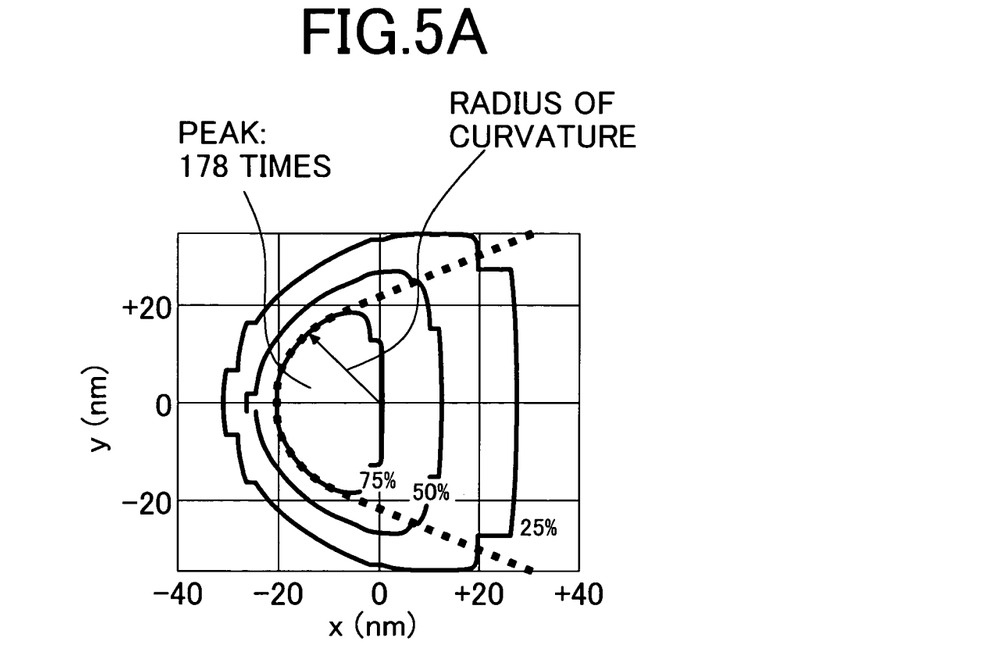
FIG. 5 explain that the generation efficiency of an optical near field is enhanced by the arrangement of a diffuser according to the invention.
Figure 5B:
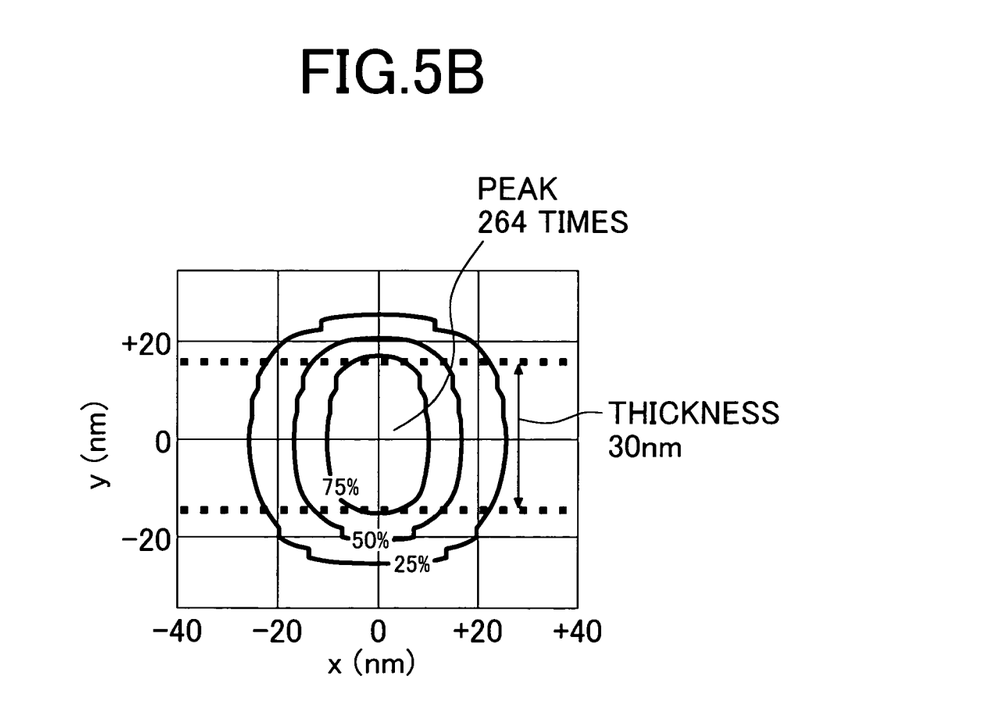
Figure 5C:
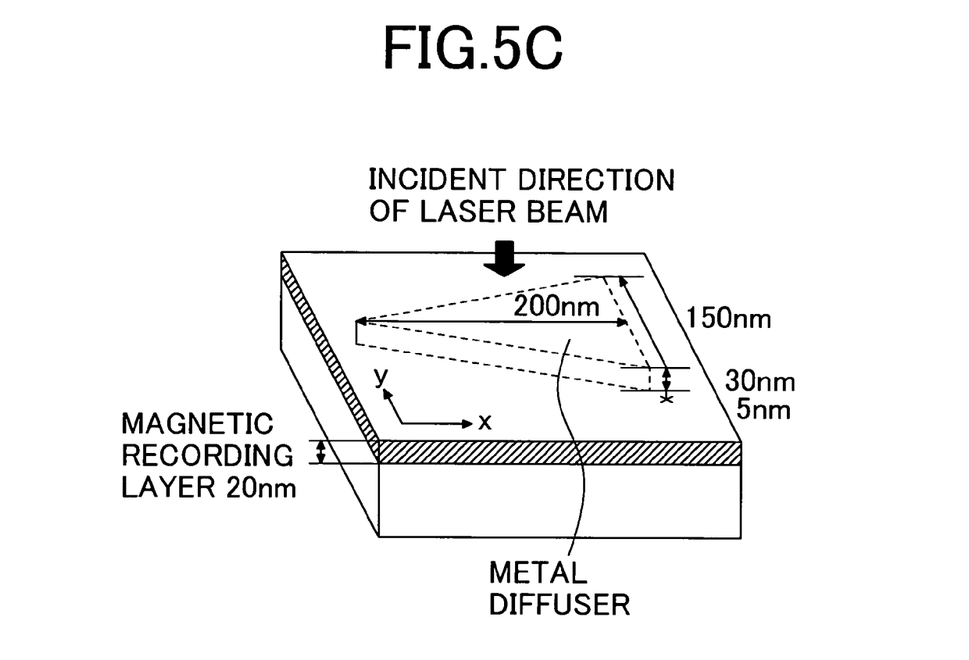
Figure 5D:
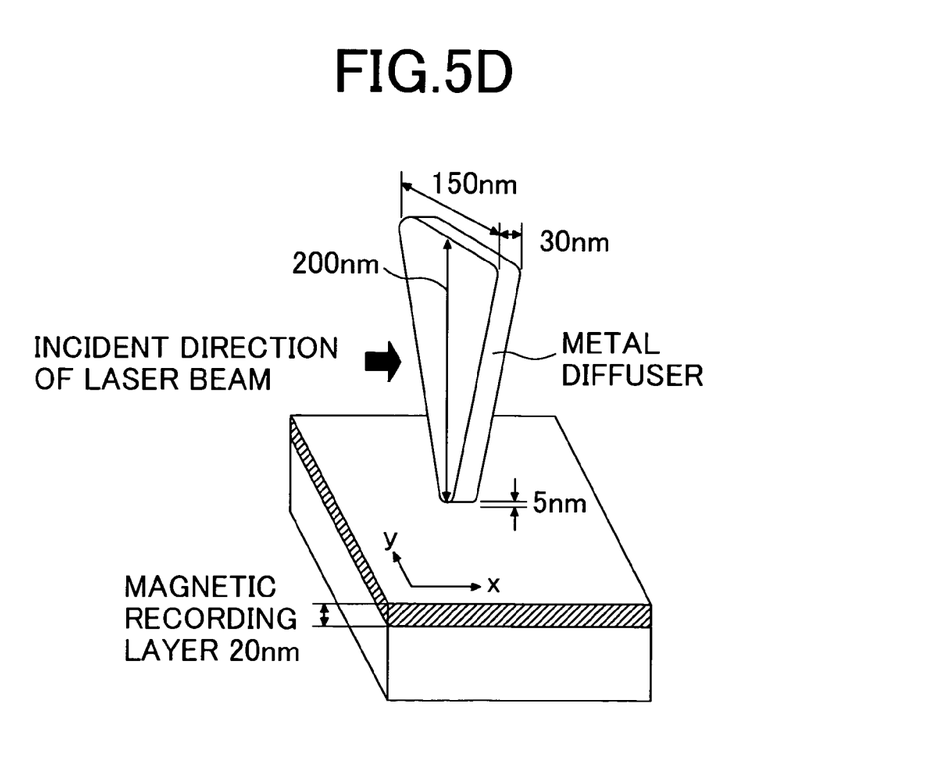

FIGS. 5A to 5D explain that the efficiency of the generation of an optical near field is enhanced depending upon the arrangement of a diffuser in the invention. Charts shown in FIGS. 5A and 5B are results in which the distribution of the intensity of an optical near field on the surface of a magnetic recording layer is calculated by computer simulation based upon a finite difference time domain (FDTD) in case an Au thin film which functions as a diffuser is arranged in the vicinity of the magnetic recording layer. In both cases, the diffuser is substantially an isosceles triangle the height of which is 200 nm and the bottom of which is 150 nm, a radius of curvature of the vertex between two sides equal in the length is 20 nm and the thickness of the diffuser is 30 nm. The shape of the diffuser is not limited to the ones shown in FIGS. 5A to 5D in which the surface irradiated by light and the back are parallel, the surface irradiated by light and a recording medium have only to be substantially perpendicular and an angle between them has only to be approximately 85 to 90 degrees. The magnetic recording layer is made of a TbFeCo amorphous alloy film parallel to an XY plane and having the thickness of 20 nm, distance between the diffuser and the magnetic recording layer is set to 5 nm and the wavelength of a light source is set to 800 nm. The result shown in FIG. 5A is a result in case the light receiving face of the diffuser is arranged in parallel with the magnetic recording layer as shown in FIG. 5C and incident light on a wavefront parallel to the light receiving face irradiates the magnetic recording layer. The result shown in FIG. 5B is a result in case the light receiving face of the diffuser is arranged perpendicularly to the y-axis (also perpendicularly to the magnetic recording layer) as shown in FIG. 5D so that the end (a substantially cylindrical part of a radius of curvature of 20 nm) of the diffuser is opposite to the recording medium as shown in FIGS. 1 to 4 and incident light on a wavefront perpendicular to the y-axis irradiates the magnetic recording layer from a negative direction of the y-axis. In both cases, a wavy line in the drawings shows a part of figures acquired by perpendicularly projecting the shape of the diffuser on the surface of the magnetic recording layer. The plot of each chart is isointensity lines showing positions equivalent to 75%, 50% and 25% of the intensity peak of an optical near field generated by the diffuser. In the case of parallel arrangement shown in FIG. 5A, the ratio of the peak intensity of an optical near field to the intensity of incident light is 178 times, while in the case of perpendicular arrangement shown in FIG. 5B, the ratio of the peak intensity of an optical near field to the intensity of incident light is 264 times and in the case of the perpendicular arrangement, as an intense optical near field as 1.5 times can be generated. The full width at a half maximum of the intensity peak in the distribution of each optical near field is 39 nm in a direction of the x-axis and 52 nm in a direction of the y-axis in the case of the parallel arrangement, while in the case of the perpendicular arrangement, the full width at the half maximum is 33 nm in the direction of the x-axis and 41 nm in the direction of the y-axis, and in the case of the perpendicular arrangement, a compact optical near field can be generated.

As described referring to FIGS. 5A to 5D, in case the light receiving face of the diffuser is arranged perpendicularly to the recording layer, an intenser and more compact optical near field can be generated. The acquisition of the intenser optical near field means that the intensity of incident light, that is, the output of the light source for exciting the diffuser can be reduced by the quantity and simultaneously means that the energy of light that does not contribute to the generation of an optical near field by the diffuser can be reduced. As a result, the realization of recording by the consumption of less energy is enabled inside the recording head, the whole rise of temperature of the recording head is inhibited and the enhancement of the reliability of the recording head and the whole information recording apparatus can be estimated.

Figure 6:
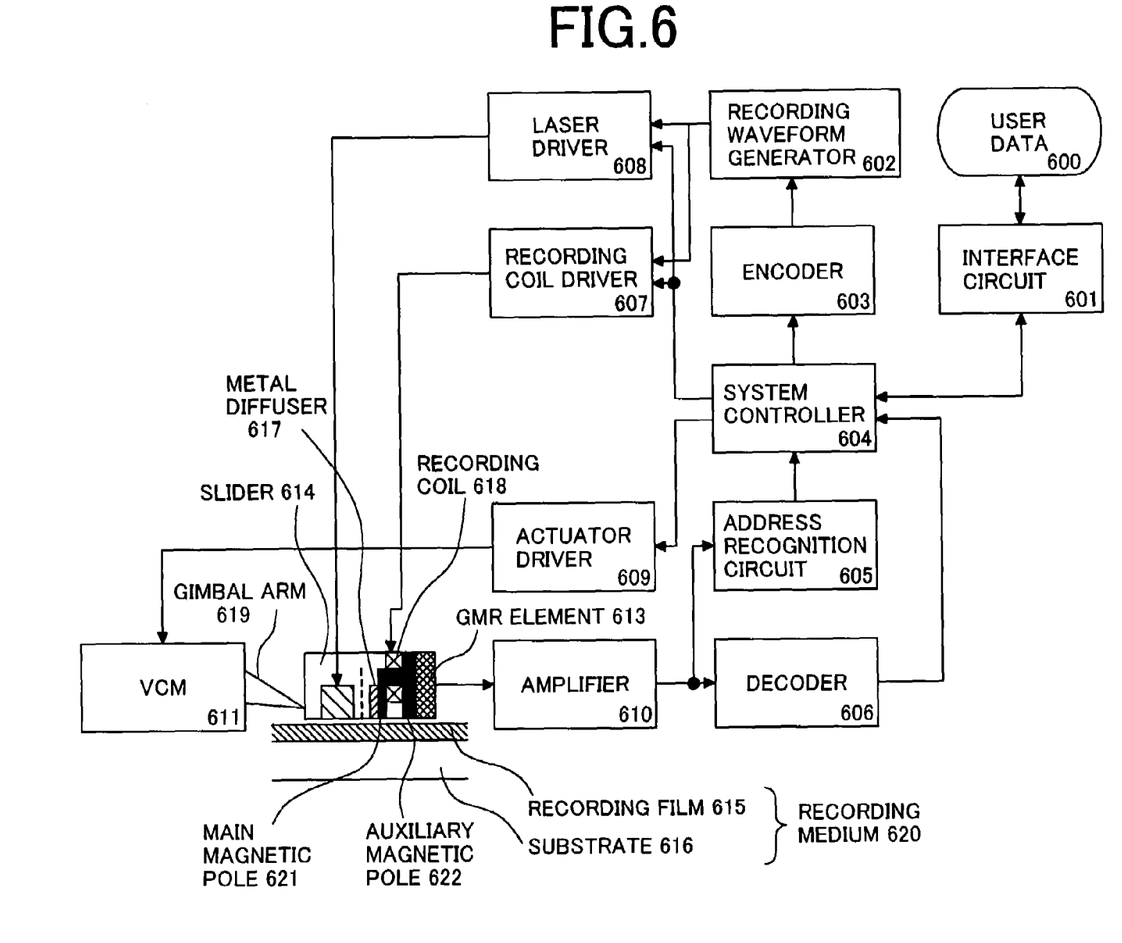
FIG. 6 shows an example of the configuration of an information recording/reading apparatus using the recording head according to the invention shown in FIG. 1.

FIG. 6 shows an example of the configuration of an information recording/reading apparatus using the recording head according to the invention shown in FIG. 1. This embodiment will be described on a premise that a GMR element that converts a magnetic flux in the vicinity of the surface of a recording medium to an electric signal as means for detecting a read signal is mounted on a slider 614 of the recording head. Needless to say, means for detecting a read signal is not limited to the GMR element and in addition to an inductive element, an MR element and a TMR element, detection by optical Kerr effect may be also adopted.

First, the acquisition performed in parallel with recording or reading operation of recorded/read position information will be described. That is, information (address information) showing a physical position on the recording medium 620 is recorded as a magnetic domain array represented according to a fixed conversion rule on a substrate 616 or on the recording medium 620 including a recording film 615 formed on the substrate 616 in manufacturing beforehand. Therefore, when the GMR element 613 which is magnetic flux detecting means scans the surface of the recording medium 620, a signal reflecting a magnetic domain array on the surface, that is, a signal showing address information is output from the GMR element 613. After the signal output from the GMR element 613 is amplified to a required level by an amplifier 610, it is input to a decoder 606, an actuator driver 609 and an address recognition circuit 605. The address recognition circuit 605 analyzes a scanned position of the slider 614 based upon the signal from the GMR element 613 and transmits it to a system controller 604. The system controller 604 suitably controls the actuator driver 609, a recording coil driver 607 and a laser driver 608 according to the positional information of the GMR element 613 and a request for recording/reading received from external equipment via an interface circuit 601. The actuator driver 609 drives a voice coil motor (VCM) 611 according to an instruction from the system controller 604 and a signal from the GMR element 613 so that a desired position on the recording medium 620 is scanned by a metal diffuser 617 and the GMR element 613. VCM 611 moves the slider 614 fixed to the end of a gimbal arm 619 according to its driving signal and positions in an arbitrary position on the recording medium 620. As described above and described referring to FIG. 1, a semiconductor laser 612, the metal diffuser 617, the GMR element 613, a recording coil 618, a main magnetic pole 621 and an auxiliary magnetic pole 622 are mounted on the slider 614.

When information is recorded, user data 600 to be recorded is sent to the system controller 604 via the interface circuit 601 with the external device and after error detection and the addition of correction information are made if necessary, the user data is transmitted to an encoder 603. The encoder 603 applies non-return-to-zero-inverted (NRZI) modulation to the user data 600 after (1, 7) modulation for example and generates a signal reflecting an array of recording magnetic domains on the recording medium 620. A recording waveform generator 602 refers to the signal and generates a control signal over a recording bias magnetic field and a control signal over laser emission intensity. The recording coil driver 607 receives an instruction from the system controller 604, drives the recording coil 618 according to the control signal over a recording bias magnetic field and generates a recording bias magnetic field in a part in which an intense optical near field is generated by the metal diffuser 617. The laser driver 608 also receives an instruction from the system controller 604 and drives the semiconductor laser 612 which is a recording energy source according to the control signal over laser emission intensity. A laser beam emitted from the semiconductor laser 612 irradiates the metal diffuser 617, the metal diffuser 617 generates an intense optical near field in a near area determined by the shape and heats the recording film 615. The recording film 615 is a perpendicular magnetic recording film (for example, a TbFeCo amorphous alloy film and a Pt/Co multi-layer film) having an axis of easy magnetization in a direction perpendicular to the film, the coercivity at ordinary temperature is higher than a recording bias magnetic field applied from the outside and the coercivity in heating by a laser beam in recording is lower than a recording bias magnetic field. A desired recording magnetic domain can be formed on the recording film by a thermomagnetic recording type by suitably controlling heating by a laser beam and a recording bias magnetic field in this configuration.

When information is read, the surface of the recording film 615 is scanned by the GMR element 613 and a signal reflecting an array of a recording magnetic domain is detected. After the signal reflecting the array of the recording magnetic domain and output from the GMR element 613 is amplified up to a required level by the amplifier 610, it is input to the actuator driver 609, the decoder 606 and the address recognition circuit 605. The decoder 606 decodes recorded data by applying the reverse conversion of the encoder 603 and transmits the result of decoding to the system controller 604. The system controller 604 detects and corrects an error if necessary and transmits the user data 600 read via the interface circuit 601 to the external equipment.

Examples of the configuration of information recording/reading apparatuses using the recording heads according to the invention shown in FIGS. 2 to 4 are not shown, however, in the examples of the configuration, the slider 614 of the recording head is suitably substituted.

According to the invention, as in the information recording apparatus that generates an optical magnetic field and thermo-magnetically records information on the recording medium, the size of a light spot used for thermomagnetic recording can be shrunk without the diffraction limit of an optical system and the limit of the material of an optical component, recording density on the recording medium can be increased and the information recording apparatus is extremely advantageous in the size and the cost. Besides, recording can be realized by the consumption of less energy and further, heat produced by the loss of the diffuser in the recording head can be promptly diffused via the magnetic pole. As a result, the risk of the deterioration and the damage of the diffuser by the rise of temperature is reduced, stress by the heat of the diffuser on the vicinity of the diffuser is minimized and the remarkable enhancement of the reliability of the recording head and the information recording apparatus can be expected.

Besides, as an area in which a temperature gradient by an optical near field is great can be made coincident with an area in the vicinity of the end of the main magnetic pole in which the gradient of a recording magnetic field by recording magnetic field generating means is the greatest by adopting specified structure for the recording head, the transition width of magnetization in the magnetic recording layer is reduced and recording density can be further increased without increasing the manufacturing precision of the metal diffuser.

What is claimed is:

1. A recording head for generating an optical near field and thermo-magnetically recording information on a recording medium, comprising:
   a light source;
   a first magnetic pole for applying a magnetic field to the recording medium; and a diffuser that generates an optical near field in the vicinity of the recording medium when light is radiated from the light source, wherein:

the diffuser is in contact with the first magnetic pole and a face from which light from the light source irradiates is substantially perpendicular to the recording medium.

2. A recording head according to claim 1, wherein:
the diffuser is arranged between a direction in which light from the light source is outgoing and the first magnetic pole with the back of the face which the light irradiates in contact with the first magnetic pole.

3. A recording head according to claim 1, further comprising:
a second magnetic pole different from the first magnetic pole, wherein:
the diffuser is arranged between the light source and the second magnetic pole.

4. A recording head according to claim 3, wherein:
the diffuser is arranged between the first magnetic pole and the second magnetic pole with the face which light irradiates of the diffuser in contact with the first magnetic pole.

5. A recording head according to claim 3, wherein:
the second magnetic pole is formed so that it is substantially perpendicular to the recording medium and is substantially orthogonal to a scanning direction.

6. A recording head according to claim 1, wherein:
the diffuser is substantially an isosceles triangle; and
the diffuser is installed with its vertex between two sides equal in the length opposite to the recording medium.

7. A recording head according to claim 1, wherein:
the diffuser is made of any of Au, Pd, Pt, Rh and Jr or an alloy of these.

8. A recording head according to claim 3, wherein:
one end of the first magnetic pole is connected to the second magnetic pole;
the other end reaches the bottom of the recording head; and
the first magnetic pole is opposite to the information recording medium.

9. An information recording/reading apparatus for generating an optical near field and thermo-magnetically recording/reading information on a recording medium, comprising:
a light source;
a magnetic pole for applying a magnetic field to the recording medium; and
a diffuser that generates an optical near field when the diffuser receives light from the light source, wherein:
the diffuser is in contact with the magnetic pole and a face from which light from the light source irradiates is substantially perpendicular to the recording medium; and
magnetic flux detection means that detects a magnetic flux of the recording medium.

10. An information recording/reading apparatus according to claim 9, further comprising:
scanning means so that the diffuser and the magnetic flux detection means scan a desired position of the recording medium.

* * * * *